July 4, 1967  R. W. HERR  3,329,035
MINIMUM BACK-LASH GEAR MECHANISM
Filed Feb. 15, 1965  5 Sheets-Sheet 1

Inventor:
Robert W. Herr,
by Hood, Gust & Irish
Attorneys.

July 4, 1967  R. W. HERR  3,329,035
MINIMUM BACK-LASH GEAR MECHANISM
Filed Feb. 15, 1965  5 Sheets-Sheet 2

Inventor:
Robert W. Herr,
by Hood, Gust & Irish
Attorneys.

July 4, 1967   R. W. HERR   3,329,035
MINIMUM BACK-LASH GEAR MECHANISM
Filed Feb. 15, 1965   5 Sheets-Sheet 3

Inventor:
Robert W. Herr,
by Hood, Gust & Irish
Attorneys.

July 4, 1967

R. W. HERR 3,329,035

MINIMUM BACK-LASH GEAR MECHANISM

Filed Feb. 15, 1965

Inventor:
Robert W. Herr,
by Hood, Gust & Irish
Attorneys.

July 4, 1967 R. W. HERR 3,329,035
MINIMUM BACK-LASH GEAR MECHANISM
Filed Feb. 15, 1965 5 Sheets-Sheet 5

Inventor:
Robert W. Herr,
by Hood, Just & Lisle
Attorneys.

United States Patent Office 3,329,035
Patented July 4, 1967

3,329,035
MINIMUM BACK-LASH GEAR MECHANISM
Robert W. Herr, Fort Wayne, Ind., assignor to Bowmar Instrument Corporation, Fort Wayne, Ind., a corporation of Indiana
Filed Feb. 15, 1965, Ser. No. 432,469
16 Claims. (Cl. 74—409)

This invention relates generally to gear mechanisms having means for minimizing back-lash, and more particularly to miniature precision speed reducing gear mechanisms having minimum back-lash adapted for use with miniature servo motors and the like.

In computers and air-borne instrumentation and control technologies it is frequently necessary to provide a speed reduction between a driving motor and the device driven thereby, a common instance being the necessity for gearing down the output shaft rotational speed of a servo motor. In these technologies, the present trend is increasingly toward miniaturization, and it is thus necessary that such speed reducing gear mechanisms be extremely small in size and constructed with great precision.

Any mesh between two gears inherently involves some amount of back-lash, i.e., a certain amount of rotation of the driving gear before rotation is imparted to the driven gear; if a perfect mesh or fit were provided between the driving and the driven gears, the two gears could be rotated only by the application of high torque and deflection of the teeth. In a speed reduction gear train, a substantial part of the cumulative back-lash appears in the output mesh, i.e., the mesh of the final pinion with the output gear, and thus minimizing back-lash in the output mesh will result in substantial reduction in the over-all back-lash of the gear train.

A common application for miniature speed reducing gear mechanisms is the driving of position-indicating devices and in such applications, it is a design objective to drive the driven device with the accuracy of the input driving device. Thus, assuming that 50 to 1 speed reduction is provided by the gear train, it is desired that exactly 50 input shaft revolutions produce exactly 1 output shaft revolution. While many back-lash reducing devices and techniques are known such spring-loaded scissors gears and the like, such prior devices and techniques do not lend themselves to use in highly miniaturized gear mechanisms.

It is accordingly a general object of the invention to provide a gear mechanism having improved back-lash reducing means.

Another object of the invention is to provide a miniature speed-reducing gear mechanism having improved back-lash reducing means.

The invention in its broader aspects provides a gear mechanism comprising a frame, a first shaft having a first gear thereon and first bearing means on the frame for rotatably supporting the first shaft. A second shaft is provided having opposite ends and a second gear thereon adjacent one of the ends and meshing with the first gear. Second bearing means are provided on the frame rotatably supporting the other end of the second shaft and third bearing means are provided rotatably supporting the one end of the second shaft. Lever means are provided pivotally mounted on the frame and having the third bearing means mounted thereon for pivotally moving the one end of the second shaft in directions to move the second gear toward and away from mesh with the first gear. Spring means are provided acting the lever means for continuously urging the lever means so as to move the second gear into close mesh with the first gear thereby to reduce back-lash between the first and second gears.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
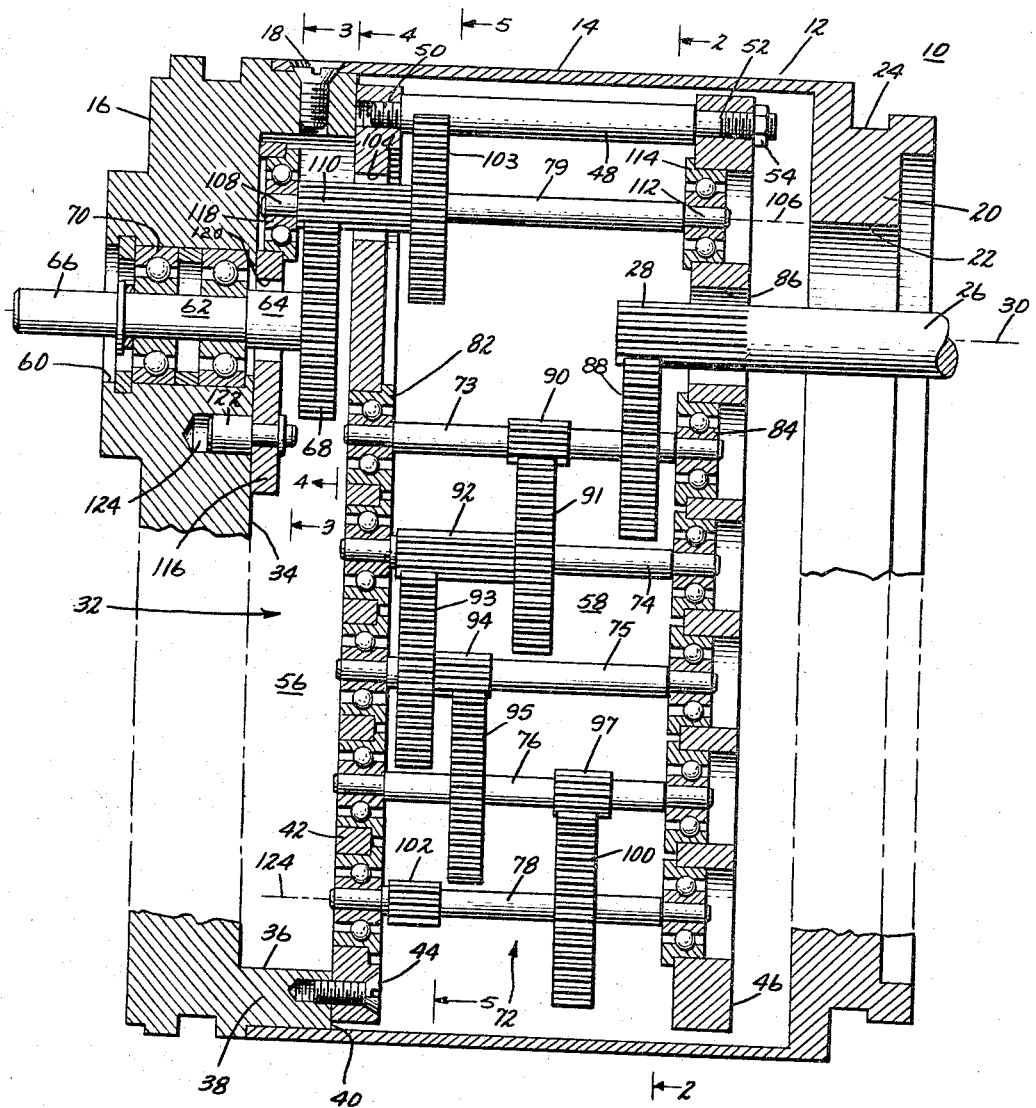
FIG. 1 is a diagrammatic "stretch-out" side cross-sectional view of a miniature speed reducing gear mechanism incorporating one embodiment of the invention.
Figure 2:
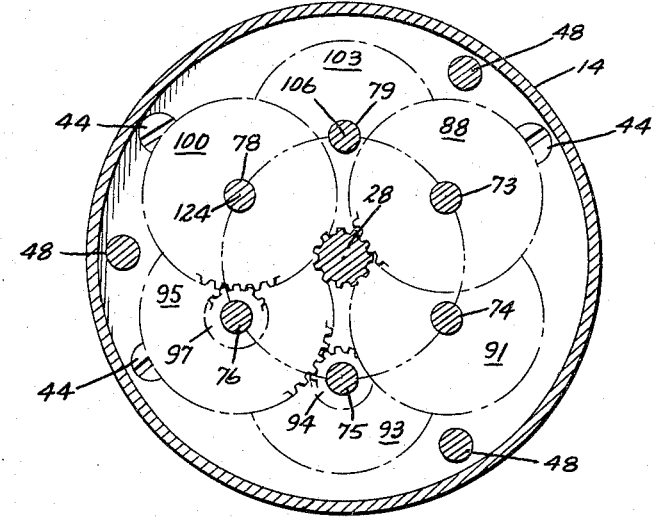
FIG. 2 is a cross-sectional view taken along the line 2—2 of FIG. 1.

Referring now to FIGS. 1 through 5 of the drawings, there is shown a miniature speed reducing gear mechanism, commonly referred to as a "gear head," generally identified as 10. The gear mechanism 10 is enclosed in a housing 12 which comprises a shell portion 14, shown here as being cylindrical in cross-section and an end wall portion 16. In the illustrated embodiment, shell 14 is separately formed from end wall 16 and is secured thereto by suitable screws 18. Shell 14 has a radially inwardly extending annular flange portion 20 formed at its end remote from end wall 16, annular flange 20 defining a central opening 22. Annular flange portion 20 has an external annular groove 24 formed therein by which the gear head 10 may be connected to a driving servo motor (not shown) in conventional fashion. Shaft 26 of the driving motor having a pinion 28 formed thereon is adapted to extend through opening 22 into the interior of the housing 12, shaft 26 being coaxial with the axis 30 of shell 14.

End wall 16 has an interior annular recess 32 formed therein having bottom surface 34, and annular surface 36, and defining an annular axially-extending portion 38 of end wall 16 having a radial end surface 40. A generally circular bearing plate 42 extends transversely across shell 14 engaging the end surface 40 of the end wall portion 38 and being secured thereto by suitable screws 44. Another generally circular bearing plate 46 extends transversely across shell 14 spaced from and parallel with plate 42 and adjacent the annular flange portion 20. Bearing plate 46 is secured to plate member 42, and thus to end wall 16, and is axially spaced therefrom by means of suitable post members 48 having threaded ends 50 threaded into suitable tapped openings in bearing plate 42 and having opposite threaded ends 52 extending through suitable openings in the bearing plate 46 and having suitable nuts 54 threaded thereon, as shown. It will be seen that bearing plate 42 closes recess 32 in end wall 16 to define a first cavity 56 and that bearing plates 42 and 46 define with shell 14 a second cavity 58.

End wall 16 has a central opening 60 formed therethrough coaxial with axis 30 and communicating with cavity 56. Output shaft 62 extends coaxially through opening 60 on axis 30 and has an extension portion 64 extending into cavity 56 and another extension portion 66 extending out of opening 60 on the exterior of end wall 16 for connection to a driven device (not shown). Output gear 68 is mounted or integrally formed on portion 64 of output shaft 62 and is positioned in the cavity 56, as shown. Suitable bearings 70 rotatably support output shaft 62 in the opening 60 in the end wall 16.

A gear train 72 is positioned within the housing 12 and interconnects the driving pinion 28 with the output gear 68 in speed reducing relationship. In the illustrated embodiment, gear train 72 is shown as comprising six gear cluster shafts, 73, 74, 75, 76, 78, 79. Shafts 73, 74, 75, 76, 78, 79, preferably have their axes evenly spaced apart on a circle, shown by dashed line 80, coaxial with axis 30, the six gear cluster shafts, 73, 74, 75, 76, 78, 79, thus being spaced apart by distances equal to the radius of circle 80 usually. Shaft 73 is supported by bearings 82, 84, respectively seated in suitable bearing pockets in the bearing plates 42, 46 and has input gear 88 mounted thereon which meshes with the input pinion 28 which extends through opening 86 in bearing plate 46 into cavity 58. Shaft 73 thus is the initial or input shaft of the gear train 72. Shafts 74, 75, 76 and 78 respectively have their opposite ends rotatably supported in suitable bearings likewise respectively seating in bearing pockets in the bearing plates 42, 46. Shaft 73 has a pinion 90 thereon meshing with gear 91 on shaft 74, which in turn has pinion 92 thereon meshing with gear 93 on shaft 75. Shaft 75 has a pinion 94 thereon meshing with gear 95 on shaft 76, which in turn has its pinion 97 meshing with gear 100 on shaft 78. Shaft 78 has its pinion 102 meshing with gear 103 on shaft 79. It will be seen that the pinions and gears 28, and 88–103 are all located in the cavity 58.

Bearing plate 42 has an opening 104 formed therein coaxial with the axis 106 of shaft 79. Shaft 79 has its end 108 extending through opening 104 into cavity 56 with pinion 110 likewise extending through opening 104 into cavity 56. Pinion 110 meshes with the output gear 68 on output shaft 62, and thus shaft 79 is the final shaft of the gear train 72. Shaft 79 has its end 112 rotatably supported by bearing 114 seated in a bearing pocket in the bearing plate 46.

A lever in the form of a generally circular plate member 116 is provided in cavity 56 adjacent surface 34 of recess 32. A bearing 118 seated in a bearing pocket in plate member 116 rotatably supports end 108 of shaft 79, and plate 116 has a central opening 120 formed therethrough through which extension 64 of output shaft 62 extends. Plate member 116 is pivotally mounted on end wall 16 by means of a suitable pivot pin 122, extending into a suitable opening 124 in the end wall 16. In accordance with an important aspect of this embodiment of this invention, the axis of the pivot pin 122 is coincident with the axis 124 of shaft 78, i.e., the next-to-last gear cluster shaft of the gear train 72.

Figure 3:
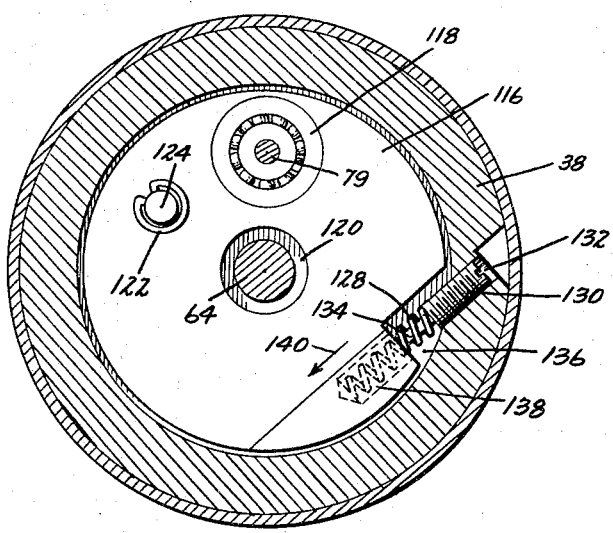
FIG. 3 is a cross-sectional view taken along the line 3—3 of FIG. 1.
Figure 4:
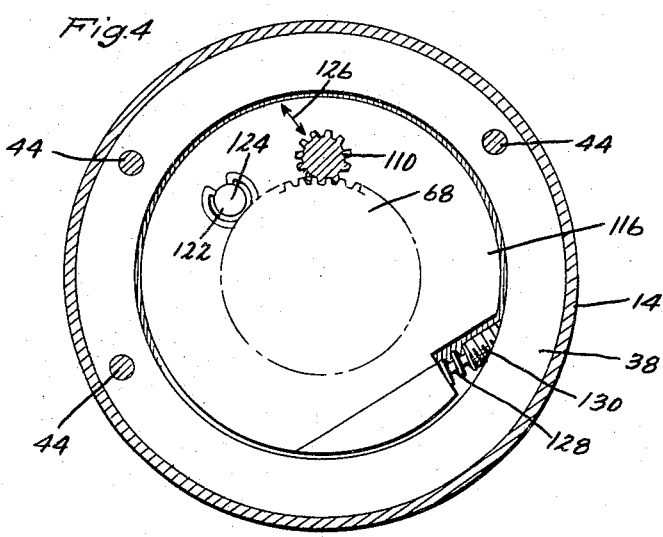
FIG. 4 is a cross-sectional view taken along the line 4—4 of FIG. 1.
Figure 5:
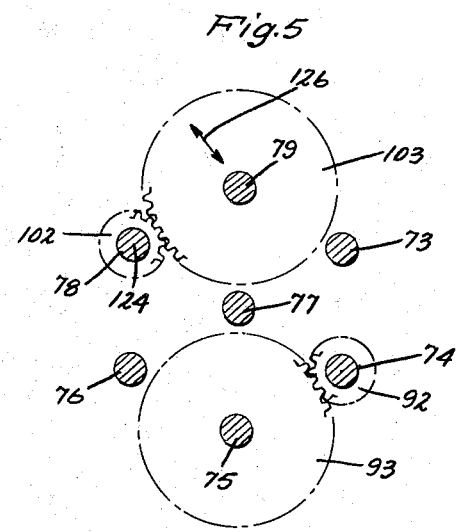
FIG. 5 is a fragmentary cross-sectional view taken along the line 5—5 of FIG. 1.

Referring now particularly to FIGS. 3, 4 and 5, it will we seen that by pivotally mounting plate member 116 on axis 124, end 108 of shaft 79 may be pivotally moved in directions, as indicated by arrow 126, so as to move gear 110 into and out of mesh with output gear 68.

Plate member 116 is continuously urged in a pivotal direction to move pinion 110 into close mesh with output gear 68 by means of a coil spring 128. An adjusting screw 130 is provided seated in a tapped opening 132 in axially extending portion 38 of end wall 16. Adjusting screw 130 has a pin 134 on the end thereof that extends into the interior of spring 128, spring 128 having one end engaging the end of the adjusting screw 130. Plate member 116 has a notch 136 formed in its periphery with an opening, shown by dashed lines 138, formed therein in general alignment with adjusting screw 130. Spring 128 extends into opening 138 and has its other end engaging the bottom thereof. Spring 128 thus acts upon axially extending portion 38 of end wall 16 (through adjusting screw 130) and upon plate member 116, exerting force upon the plate member 116 in the direction shown by the arrow 140 thereby to pivot plate member 116 about pivot pin 122 so as to urge pinion 110 into close mesh with output gear 68. It will be readily understood that the force exerted by the spring 128 upon plate member 116 may be selectively adjusted by means of the adjusting screw 130.

Referring particularly to FIG. 5, it will be seen that gear 103 on final shaft 79 meshes with pinion 102 on the next-to-last shaft 78 which is immediately adjacent shaft 79. It will now be seen that by pivoting plate member 116 and thus shaft 79 and gear 103 about the axis 124 of shaft 78 in the direction shown by the arrow 126 thereby to move pinion 110 into closer mesh with output gear 68, the mesh of gear 103 on shaft 79 with pinion 102 on shaft 78 is unaffected, i.e., gear 103 merely rolls on pinion 102 as shaft 79 is pivoted about axis 124 in either direction without moving out of mesh or more closely into mesh with pinion 102.

It will be readily understood that the above-described pivotal movement of end 108 of shaft 79 and pinion 110 about the axis 124 of pivot pin 122 will move the axis of shaft 79 out of exact parallelism with the axes of the other shafts of the gear train 72. However, it will be understood further that only a slight degree of such pivotal movement is required in order to maintain pinion 110 in the requisite close mesh with output gear 68 so as to minimize back-lash between pinion 110 and gear 68, this slight movement being accommodated by torsion of shaft 79 and/or relative movement of the inner race of the bearing 114 which rotatably supports the opposite end 112 of shaft 79.

It will be seen that spring 128 acts upon the pivoted plate member 116 at a point thereon generally diametrically opposite from the pivot pin 112 thereby providing a mechanical advantage. It will further be seen that the above-described arrangement automatically provides compensation for wear of the teeth of pinion 110 and output gear 86 and also for any eccentricity which may be present in either or both bearings 70 and 118.

Figure 6:
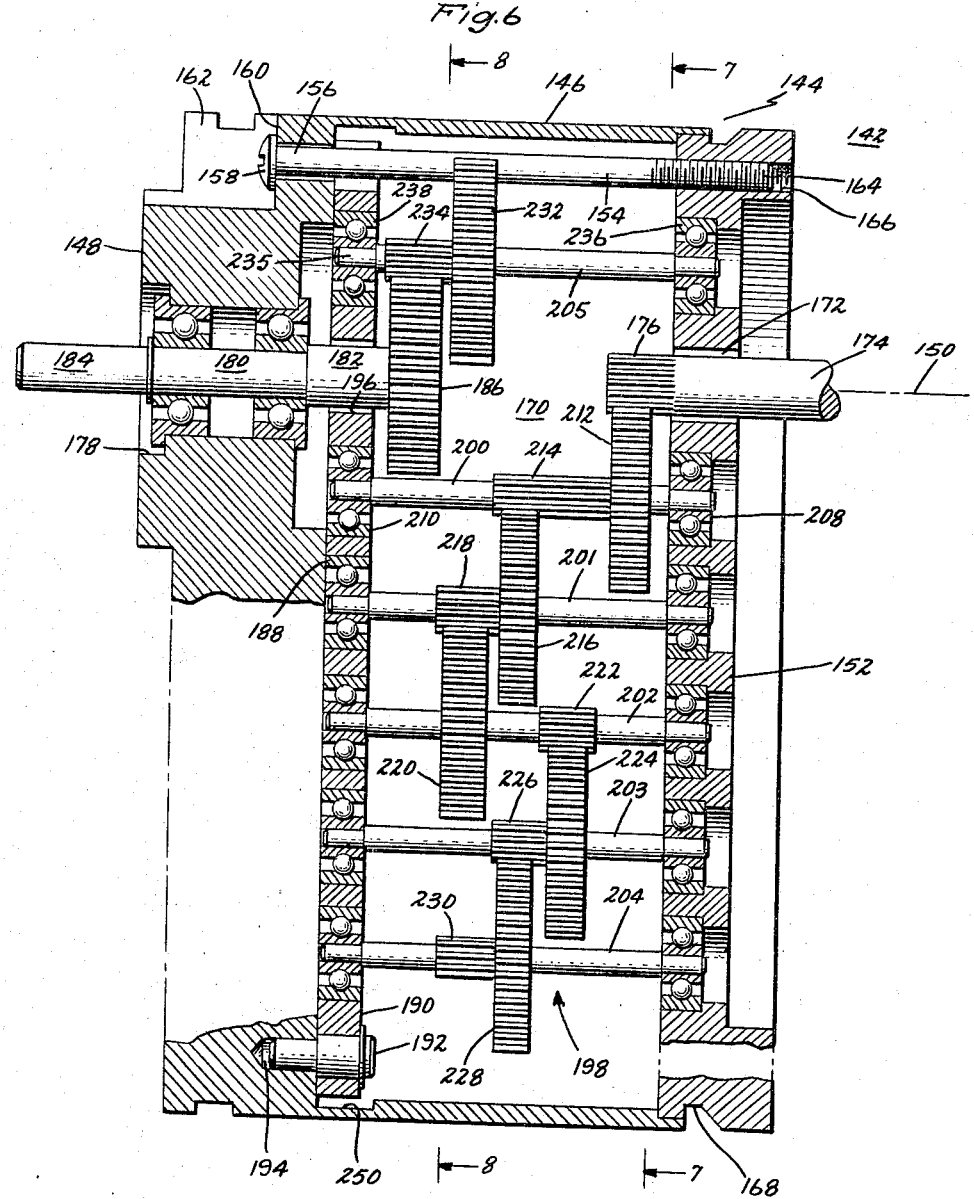
FIG. 6 is a diagrammatic "stretch-out" side cross-sectional view of a miniature speed reducing gear mechanism incorporating another embodiment of the invention.
Figure 7:
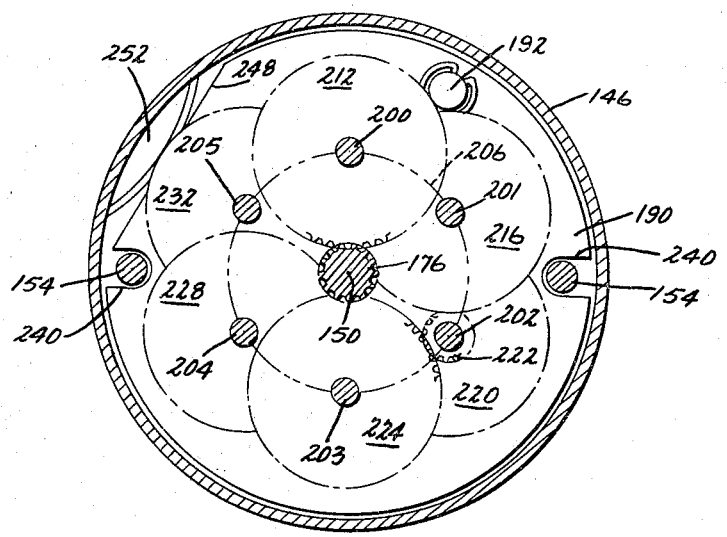
FIG. 7 is a cross-sectional view taken along the line 7—7 of FIG. 6.
Figure 8:
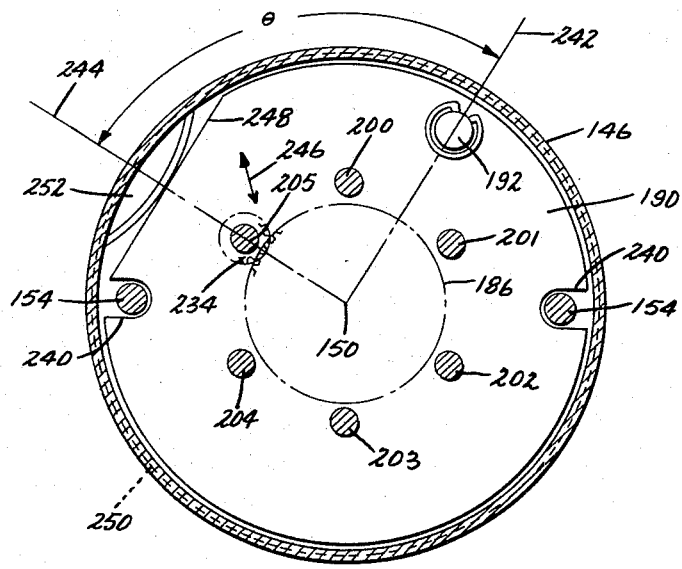
FIG. 8 is a cross-sectional view taken along the line 8—8 of FIG. 6.

Referring now to FIGS. 6, 7 and 8 in which another miniature speed reducing mechanism or gear head 142 is shown which is suitable for even smaller sizes than the gear head 10 of the previous embodiment, gear head 142 comprises a housing 144 having a cylindrical shell portion 146 integrally joined to end wall portion 148, shell portion 146 having an axis 150. A bearing plate member 152 extends across the open end of shell portion 146 in spaced parallel relationship with end wall portion 148 and is secured thereto by means of suitable through-bolts 154. Through-bolts 154 extend through suitable openings 156 in the end wall portion 148 and have their heads 158 engaging the bottoms 160 of slots 162 formed therein. Threaded ends 164 of through-bolts 154 are received in suitable tapped openings 166 in the bearing plate member 152. Bearing plate member 152 has an annular groove 168 formed in its outer periphery for attaching the gear head 142 to a conventional servo motor (not shown) in conventional manner.

Bearing plate 152 defines a cavity 170 with end wall portion 148 and shell portion 146. End plate 152 has a central opening 172 formed therein through which shaft 174 of the driving servo motor is adapted to extend. Shaft 174 is thus the input shaft to the gear head 142 and has a pinion 176 cut on its end which extends into cavity 170.

End wall portion 148 has a central opening 178 formed therein coaxial with axis 150 and communicating with cavity 170. Output shaft 180 extends coaxially through opening 178 and has an extension portion 182 extending into cavity 170 and another extension portion 184 extending out of opening 178 on the exterior of end wall portion 148 to which the driven device (not shown) may be connected. Output gear 186 is mounted or formed on the extension 182 of output shaft 180 in cavity 170.

End wall portion 148 has an inner radial surface 188 facing cavity 170. Another generally circular bearing plate 190 is provided in cavity 170 adjacent surface 188 of the end wall portion 148. Bearing plate 190 is pivotally mounted on end wall portion 148 by means of a suitable pivot pin 192 extending into a suitable opening 194 formed in the inner surface 188 of the end wall portion 148. Bearing plate 190 has a central opening 196 coaxial with axis 150 through which extension portion 182 of the output shaft 180 extends with suitable clearance.

A gear train 198 is positioned in cavity 170 and in the illustrated embodiment comprises six gear cluster shafts 200, 201, 202, 203, 204 and 205. As best seen in FIG. 7, gear cluster shafts 200–205 are equally spaced about a circle, shown by dashed line 206, concentric with axis 150, the distances between the shafts 200–205 being respectively equal to the radius of the circle 206.

Gear cluster shaft 200 has its opposite ends respectively rotatably supported by suitable bearings 208, 210, respectively seated in bearing pockets in bearing plates 152, 188. Gear cluster shaft has a gear 212 meshing with input pinion 176, and thus shaft 200 is the initial shaft of the gear train 198. Shaft 200 has a pinion 214 thereon meshing with gear 216 on shaft 201, which has a pinion 218 thereon meshing with gear 220 on shaft 202. Shaft 202 has pinion 222 meshing with gear 224 which has a pinion 26 thereon meshing with gear 228 on shaft 204. Shaft 204 has pinion 230 thereon meshing with gear 232 on shaft 205. Shaft 205 has pinion 234 thereon meshing with output gear 186 on output shaft 180 and gear cluster shaft 205 is therefore the final shaft of the gear train 198. The opposite ends of shafts 201, 202, 203, 204 and 205 are respectively rotatably supported by suitable bearings 236, 238 seated in bearing pockets in the bearing plates 152, 188.

Referring now particularly to FIGS. 7 and 8, bearing plate 190 has notches 240 respectively formed in its outer periphery through which the through-bolts 154 pass and which provide suitable clearance therewith to accommodate the pivotal movement of bearing plate 190 now to be described. It will be seen that the pivot pin 192 is located at a point on bearing plate 190 radially outwardly from the circle 206 upon which the axes of the gear cluster shafts 201–205 are located. It will further be seen that a line 242 lying in a plane normal to axis 150 and the axes of the gear cluster shafts extending through axis 150 and the axis of pivot pin 192 defines an angle θ 244 lying in the same plane and extending through the axis 150 and the axis of shaft 205, the angle θ being 90° (in the illustrated embodiment). It is thus seen that the bearing plate 190 is provided with limited pivotal movement about pin 192 so as to pivotally move end 235 of final gear cluster shaft 205 in the directions shown by the arrow 246, thereby to move pinion 234 into and out of mesh with the output gear 186. It will be observed that in this embodiment, the ends of the other gear cluster shafts 200–204 which are rotatably supported by the bearings seated in bearing plate 190 are also simultaneously moved by the pivotal movement of bearing plate 190 and thus, while the gears and pinions comprising gear train 198 are given a slight twist, the mesh of the gears and pinions comprising the gear train 198 is essentially unaffected by this pivotal movement; as in the case of the embodiments of FIGS. 1–5, only very limited pivotal movement of bearing plate 190 is required in order to move pinion 234 into close mesh with output gear 186, this pivotal movement being accommodated by torsion of the gear cluster shafts 200–205 and/or movement of the inner races of the ball bearings which rotatably support the gear cluster shafts on the bearing plate 152.

Bearing plate 190 has a flat 248 formed on its outer surface normal to the line 244, as best seen in FIG. 8. An annular groove 250 is formed in the inner surface of shell portion 146 adjacent end wall portion 148 in radial alignment with the bearing plate 190. A leaf spring 252 is provided having its opposite ends seated in groove 250 and engaging the same and its center portion engaging flat 248 of bearing plate 190 at the intersection of line 244 therewith. It will thus be seen that the leaf spring 252 is continually urging bearing plate 190 in a direction so as to move the pinion 234 into close mesh with the output gear 186, thereby minimizing the back-lash between the pinion 234 and output gear 186.

While there have been described above the principles of this invention in connection with specific apparatus, it is to be clearly understood that this description is made only by way of example and not as a limitation to the scope of this invention.

What is claimed is:

1. A gear mechanism comprising: a frame; a first shaft having a first gear thereon; first bearing means on said frame for rotatably supporting said first shaft; a second elongated shaft having opposite sides and a second gear thereon adjacent one of said ends and meshing with said first gear; second bearing means on said frame rotatably supporting the other end of said second shaft; third bearing means rotatably supporting said one end of said second shaft; lever means pivotally mounted on said frame and having said third bearing means mounted thereon for pivotally moving said one end of said second shaft in directions to move said second gear toward and away from mesh with said first gear; and spring means acting on said frame and said lever means for continuously urging the same to move said second gear into close mesh with said first gear thereby to reduce back-lash between said first and second gears.

2. The mechanism of claim 1 wherein the axes of said first and second shafts are in spaced parallel relationship and said first and second gears are spur gears, and wherein said lever means is pivotally mounted on an axis parallel with the axes of said shafts for movement in a plane normal to said axes.

3. The mechanism of claim 1 wherein said frame comprises a housing having a shell, an end wall joined to said shell, and a plate member in spaced parallel relationship with said end wall and defining a cavity with said end wall and shell, said end wall having an opening therethrough communicating with said cavity, said first shaft extending through said opening with said first gear in said cavity, said first bearing means being mounted on said end wall; said second shaft being in said cavity with its axis in spaced parallel relationship with the axis of said first shaft, said second bearing means being mounted on said plate member and said second shaft extending toward said end wall; said first and second gears being spur gears; and wherein said lever means is in said cavity and pivotally mounted on said end wall on an axis spaced from and parallel with the axes of said shafts for movement in a plane normal to said axes.

4. A miniature gear mechanism comprising: a housing having a shell portion, an end wall portion joined to said shell portion, and a plate member extending across said shell portion in spaced parallel relationship with said end wall portion and defining a cavity with said end wall and shell portions, said plate member being joined to one of said housing portions, said end wall portion having an opening therethrough and communicating with said cavity; an output shaft having a first axis and extending through said opening into said cavity, said output shaft having an output gear thereon in said cavity; first bearing means on said end wall portion rotatably supporting said output shaft; a gear train in said cavity and including a final shaft having opposite ends and a pinion thereon meshing with said output gear, said final shaft having a second axis in spaced parallel relationship with said first axis; second bearing means on said plate member and rotatably supporting one end of said final shaft; third bearing means adjacent said end wall portion rotatably supporting the other end of said final shaft; lever means in said cavity pivotally mounted on said end wall portion on a third axis spaced from and parallel with said first and second axes and having said third bearing mounted thereon for pivotally moving said other end of said final shaft in directions to move said pinion toward and away from mesh with said output gear; and spring means acting on said housing and said lever means for continuously urging the same to move said pinion into close mesh with said output gear thereby to reduce back-lash between said pinion and output gear.

5. The mechanism of claim 4 wherein said lever means comprises a second plate member lying in a plane normal to said axes and having an opening therethrough, said output shaft extending through said second plate member opening.

6. The mechanism of claim 5 wherein said spring means comprises a coil spring having one end engaging one of said housing portions and its other end engaging said second plate member at a point on the periphery thereof spaced from said third axis, said second plate member opening being intermediate said point and third axis.

7. The mechanism of claim 5 wherein a first line lying in said plane and passing through said first and second axes defines generally a right angle with a second line lying in said plane and passing through said first and third axes; and wherein said spring means comprises a leaf spring engaging said shell and a point on the periphery of said second plate member adjacent said first line.

8. The mechanism of claim 4 wherein said final shaft has a second gear thereon, wherein said gear train includes a second shaft having opposite ends and a second pinion thereon meshing with said second gear, fourth bearing means mounted on said plate member rotatably supporting one end of said second shaft, and fifth bearing means mounted on said housing and rotatably supporting the other end of said second shaft, said second shaft having an axis coaxial with said third axis whereby said pivotal movement of said lever means does not affect the mesh of said second gear with said second pinion.

9. The mechanism of claim 4 wherein said final shaft has a second gear thereon, wherein said gear train includes a second shaft having opposite ends and a second pinion thereon meshing with said second gear, said second shaft having a fourth axis spaced from and parallel with said first, second and third axes, fourth bearing means mounted on said plate member rotatably supporting one end of said second shaft; and fifth bearing means mounted on said lever means and rotatably supporting the other end of said second shaft.

10. The mechanism of claim 4 wherein said end wall portion has a recess formed therein communicating with said cavity, said output gear, final shaft pinion and lever means being disposed in said recess, and further comprising a second plate member secured to said end wall portion and extending across said recess, said second plate member having an opening formed therethrough, said final shaft extending through said second plate member opening; and wherein said final shaft has a second gear thereon on the side of said second plate member remote from said recess, said gear train including a second shaft having opposite ends and a second pinion thereon meshing with said second gear, fourth bearing means mounted on said first-named plate member and rotatably supporting one end of said second shaft, and fifth bearing means mounted on said second plate member and rotatably supporting the other end of said second shaft, said second shaft having an axis coincident with said third axis whereby said pivotal movement of said lever means does not affect the mesh of said second gear with said second pinion.

11. A miniature speed reducing gear mechanism comprising: a housing including a cylindrical shell portion having a first axis, an end wall portion joined to said shell portion, a first plate member extending across said shell portion in spaced parallel relationship with said end wall portion and defining a cavity with said end wall portion and shell portion, said first plate member being joined to one of said housing portions, and a second plate member extending across said cavity intermediate said first plate member and end wall portions and respectively, parallel therewith, said second plate member being joined to one of said housing portions and dividing said cavity into a first portion on the side of said second plate member facing said end wall portion and a second portion on the side thereof facing said first plate member, said end wall portion having an opening therethrough; an output shaft coaxial with said first axis and extending through said end wall portion opening into said first cavity portion; an output gear on said output shaft in said first cavity portion; first bearing means mounted on said end wall portion and rotatably supporting said output shaft; said second plate member having an opening therethrough; a gear train in said cavity including a final shaft having opposite ends, said final shaft having a second axis spaced from and parallel with said first axis and extending through said second plate member opening, a first pinion on said final shaft in said first cavity portion and meshing with said output gear, a second gear on said final shaft in said second cavity portion, second bearing means mounted on said first plate member and rotatably supporting one end of said final shaft, third bearing means rotatably supporting the other end of said final shaft, a second shaft in said second cavity portion having opposite ends and a third axis spaced from and parallel with said first and second axes, a second pinion on said second shaft meshing with said second gear, fourth and fifth bearing means respectively mounted on said first and second plate members and respectively rotatably supporting said second shaft, a third plate member in said first cavity portion, said third bearing means being mounted on said third plate member, said third plate member having an opening with said output shaft extending therethrough; means mounting said third plate member on said end wall portion for pivotal movement about said third axis in a plane normal to said axes thereof to move said other end of said final shaft in directions to move said first pinion toward and away from mesh with said output gear without affecting the mesh of said second gear and second pinion; and spring means acting on one of said housing portions and said third plate member for continuously urging the same to move said first pinion into close mesh with said output gear thereby to reduce back-lash between said first pinion and output gear.

12. The mechanism of claim 11 wherein said end wall portion has an annual recess formed therein coaxial with said first axis and defining an annular extension portion of said end wall portion, said recess forming said first cavity portion, said second plate member being secured to said extension portion; wherein said third plate member is generally annular and wherein said spring means comprises a coil spring having one end engaging said extension portion and its other end engaging said third plate member at a point generally diametrically opposite from said third axis.

13. The mechanism of claim 11 wherein said gear train includes an initial shaft having a gear thereon adapted to mesh with and be driven by a pinion on an input shaft, wherein the axes of said gear train shafts are located about a circle coaxial with said first axis and equally spaced apart by distances equal to the radius of said circle, said final and second shafts being adjacent.

14. A miniature speed reducing gear mechanism comprising: a housing including a cylindrical shell portion having a first axis, an end wall portion joined to said shell portion, and a first plate member extending across said shell portion in spaced parallel relationship with said end wall portion and defining a cavity with said end wall portion and shell portion, said first plate member being joined to one of said housing portions, and said end wall portion having an opening therethrough; an output shaft coaxial with said first axis and extending through said end wall portion opening into said cavity; an output gear on said output shaft in said cavity; first bearing means mounted on said end wall portion and rotatably supporting said output shaft; a gear train in said cavity including a final shaft having opposite ends and a second axis spaced from and parallel with said first axis, a first pinion on said final shaft adjacent one end thereof and meshing with said output gear, a second gear on said final shaft intermediate said first pinion and the other end of said final shaft, second bearing means mounted on said first plate member and rotatably supporting said other end of said final shaft, third bearing means rotatably supporting said one end of said final shaft, a second shaft having opposite ends and a third axis spaced from and parallel with said first and second axes, a second pinion on said second shaft meshing with said second gear, fourth bearing means mounted on said first plate member and rotatably supporting one end of said second shaft, fifth bearing means rotatably supporting the other end of said second shaft; a second plate member in said cavity adjacent said end wall portion and having said third and fifth bearing means mounted thereon, said second plate member having a central opening with said output shaft extending therethrough; means mounting said second plate member on said end wall portion for pivotal movement about a fourth axis spaced from and parallel with said first, second and third axes in a plane normal to said axes thereby to move said one end of said final shaft in directions to move said first pinion toward and away from mesh with said output gear; and spring means acting on one of said housing portions and said second plate member for continuously urging the same to move said first pinion into close mesh with said output gear thereby to reduce back-lash between said first pinion and output gear.

15. The mechanism of claim 14 wherein said gear train includes an initial shaft having a gear thereon adapted to mesh with and be driven by a pinion on an input shaft, wherein the axes of said gear train shafts are located about a circle coaxial with said first axis and equally spaced apart by distances equal to the radius of said circle, wherein said fourth axis is radially spaced from said first axis by a distance greater than the radius of said circle, and wherein a first line lying in a plane normal to said axes and passing through said first and fourth axes defines generally a right angle with a second line lying in said last-named plane and passing through said first and second axes.

16. The mechanism of claim 14 wherein said second plate member is generally annular; wherein a first line lying in a plane normal to said axes and passing through said first and fourth axes defines generally a right angle with a second line lying in said last-named plane and passing through said first and second axes; wherein said second plate member has a spring-engaging surface formed on its outer periphery at the intersection of said second line therewith; and wherein said spring means comprises a leaf spring having opposite ends respectively, the inner surface of said shell portion adjacent said end wall portion and a second portion engaging said surface of said second plate member.

References Cited

UNITED STATES PATENTS

| | | | |
|---|---|---|---|
| 2,936,644 | 5/1960 | Miller | 74—421 |
| 2,950,635 | 8/1960 | Bieger et al. | 74—421 X |
| 3,009,366 | 11/1961 | Roberts | 74—421 |
| 3,011,358 | 12/1961 | Moore | 74—409 |
| 3,198,028 | 8/1965 | Dahl et al. | 74—409 |

DONLEY J. STOCKING, *Primary Examiner.*

DAVID J. WILLIAMOWSKY, *Examiner.*

L. H. GREEN, *Assistant Examiner.*